J. STONE.
BEET HARVESTING MACHINE.
APPLICATION FILED APR. 17, 1913.
1,113,505.
Patented Oct. 13, 1914.
3 SHEETS—SHEET 3.
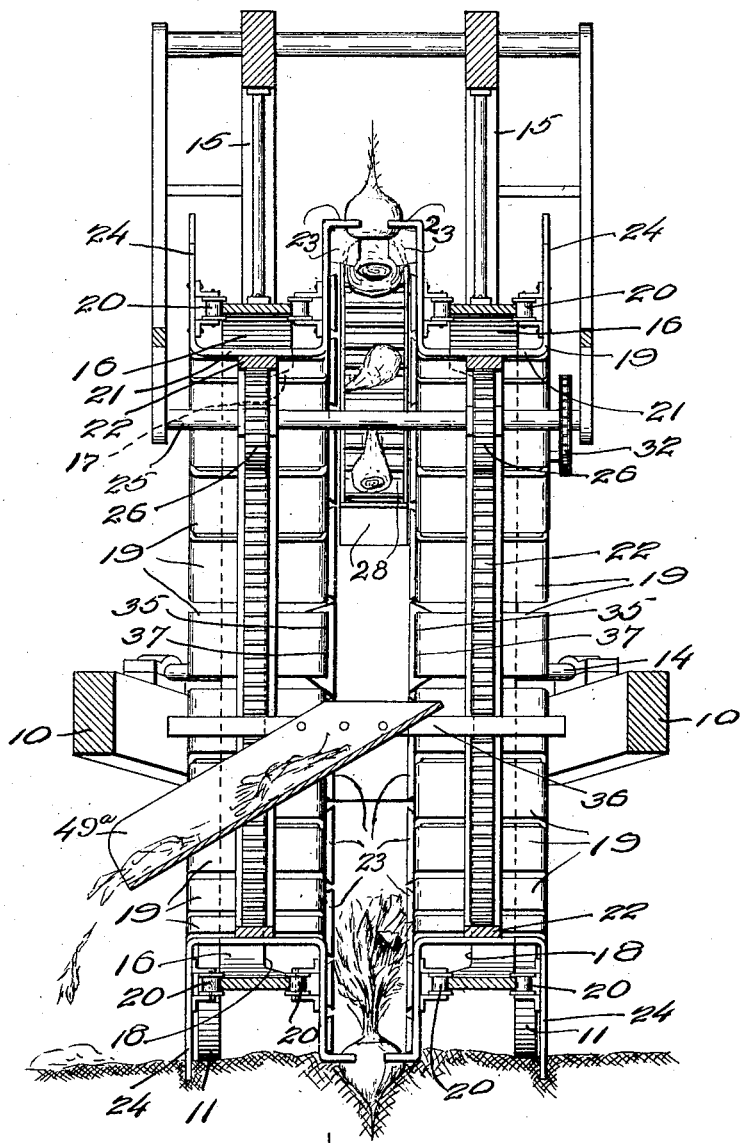
Fig-3-
WITNESSES:
INVENTOR
J. Stone.
BY
H S Woodward
ATTORNEY

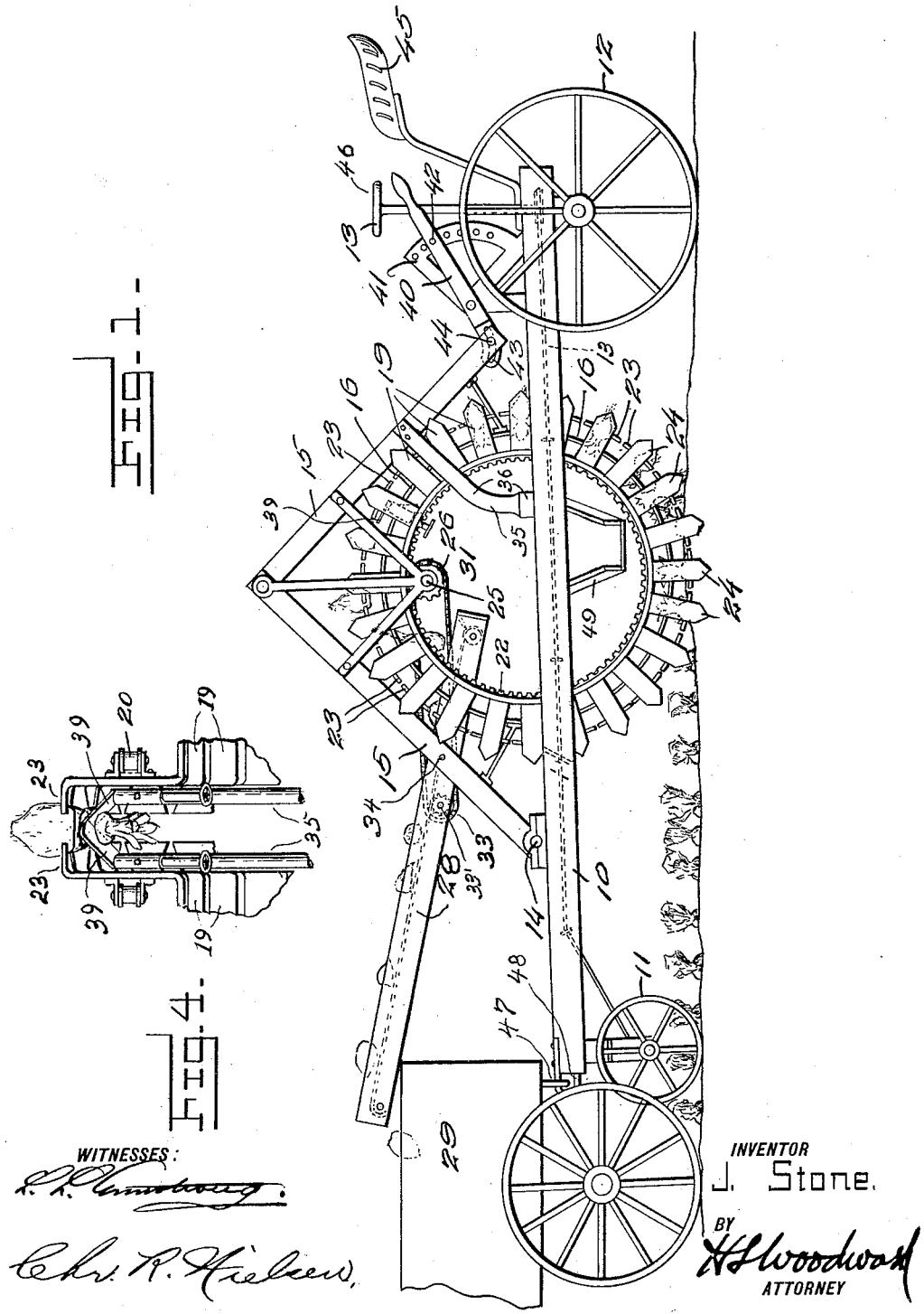

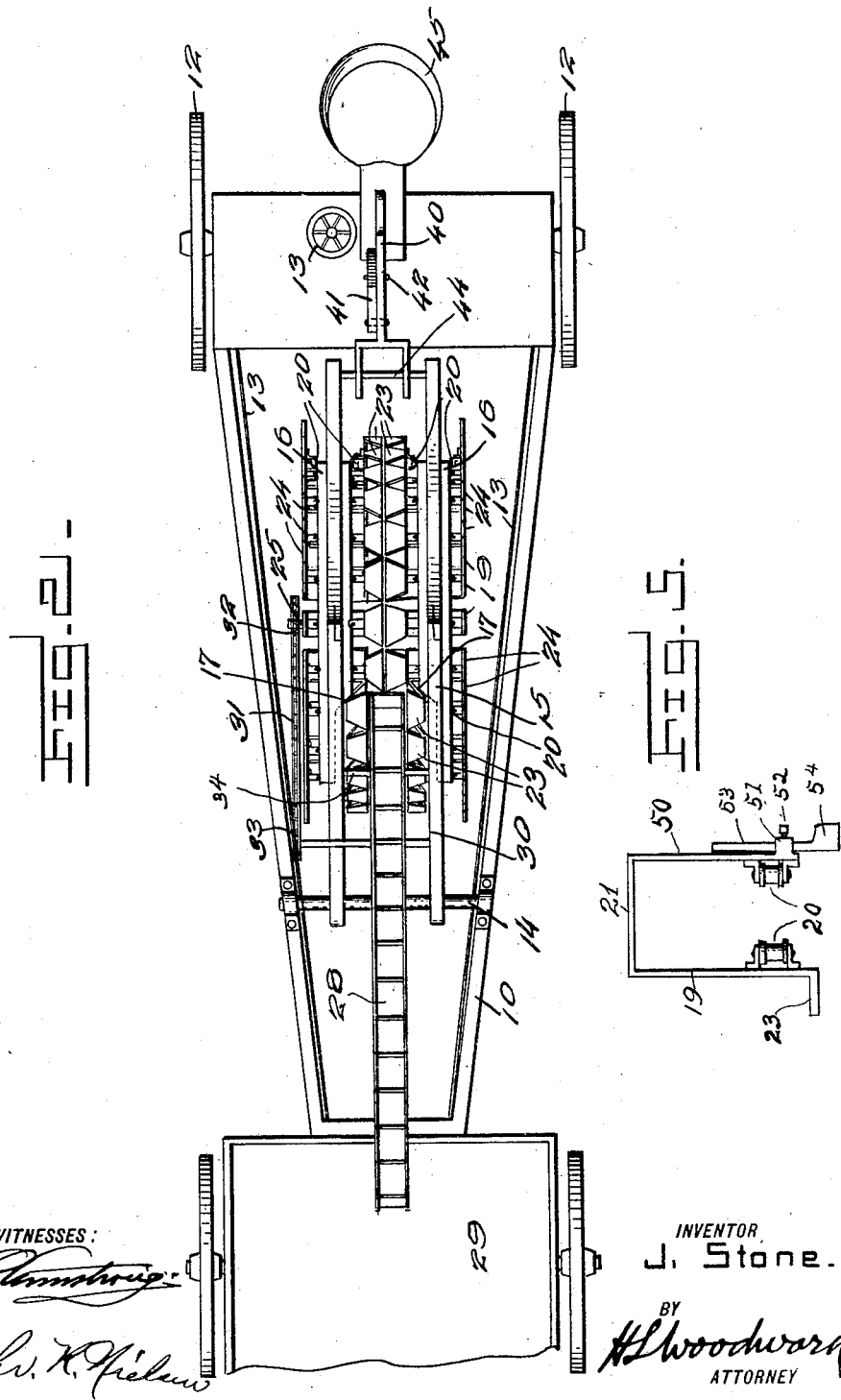

UNITED STATES PATENT OFFICE.

JOHN STONE, OF PAMPA, TEXAS.

BEET-HARVESTING MACHINE.

1,113,505.  Specification of Letters Patent.  Patented Oct. 13, 1914.

Application filed April 17, 1913. Serial No. 761,811.

*To all whom it may concern:*

Be it known that I, JOHN STONE, a citizen of the United States, residing at Pampa, in the county of Gray and State of Texas, have invented new and useful Improvements in Beet-Harvesting Machines, of which the following is a specification.

This invention relates to beet harvesting machines, and has for its object to provide a simple and cheap construction in such devices adapted to perform its functions efficiently and with a minimum of friction in the operation of its parts.

It is an aim to provide a beet harvesting, topping and delivering means which will require few operative connections, and which will not need to be made of extremely heavy construction.

It is an object to obviate the necessity for driving connections between the beet gathering means and traction wheels supporting the machine, but to construct the beet gripping means to at the same time engage the ground for its own operation by direct leverage.

A further object is to provide an efficient topping mechanism and novel operative connections therefor.

A still further object is to provide an improved delivery.

An additional object is to arrange in a simple way for the clearance of the tops when removed.

It is also the purpose to provide an efficient and novel means for regulating the operation of the harvesting mechanism and throwing it out of operation at will.

Additional objects and advantages will be apparent, some of which will appear from the following description and from the drawings, in which—

Figure 1 is a side view of the machine, Fig. 2 is a top view thereof, Fig. 3 is a cross section thereof, Fig. 4 is a detail of the topping knives, Fig. 5, is a detail of one of the spring yokes.

There is illustrated a harvester comprising a wheeled frame 10 the forward wheels 11 of which are much smaller than the rear ones 12, the frame being triangular in plan, and its forward end being mounted very low and the wheels 11 thereat being spaced closely together so that the forward end may be run closely under the body of a wagon, so that the machine may be pulled behind the wagon and the wagon loaded thereby. By this arrangement only two men are required to drive the wagon and machine, and to operate the machine, and but one team is needed. This is made possible because of the extreme lightness of the harvester, as will appear. The forward wheels are controlled by any suitable form of steering mechanism 13 operated from the rear end of the machine, so that it may be maintained in proper position over the rows of beets to be harvested.

Pivoted on a large transverse shaft 14 located a distance from the forward end of the frame 10 there is a superstructure 15 consisting as shown of two triangular frames principally, although any other suitable construction may be used. Carried by this superstructure there is a pair of parallel vertically disposed annular metal bands or plates 16 attached to the superstructure by suitable rods extending centrally from the outer sides of the plates at proper distances. A short distance forwardly of the upper most parts of these plates the opposed edges of each pair are inclined outwardly from each other as at 17, the plates being narrowed for that purpose, and at 18 on the lower sides the edges are inclined inwardly to continue parallel to the point of outward inclination mentioned.

A multiplicity of U-shaped spring yokes 19 having grooved rollers 20 mounted on each arm in registry with each other and on axes parallel to the arms, are arranged with their arms on opposite sides of respective plates 16, the edges of the plates being received in the grooves of the rollers. The bights 21 of the yokes are disposed inwardly of the plates, and all of the yokes on each plate 16 are connected by a respective annular rack member 22, concentric to the plate, the teeth thereof being presented inwardly. The segment arms of the yokes on the two plates 16 are provided with coöperating jaws 23 at their extremities, projected laterally from the arms a sufficient distance to coengage tightly against opposite sides of the body of a beet when the yokes are on the wide parts of the plates. The opposite or outer arms 24 of the yokes are longer, and their extremities are adapted for engagement with the ground when they are at the lower limit of their orbits and the superstructure is lowered, as will be described. The jaws 23 may be extended so that the adjacent jaws of the yokes on the same ring will nearly or quite abut and form a continuous annular series.

Carried by the superstructure there is a transverse revoluble shaft 25, having two gears 26 of like size meshed with respective racks 22 whereby these are held with their yokes in alinement for proper coöperation of the jaws 23. This shaft may be utilized to operate the conveyer 28 extending upwardly and forwardly from between the front jaws 23, and adapted to receive the beets released from between the jaws, for conveyance to the body of a wagon 29 to which the harvester is attached. It is of course possible to arrange this conveyer to discharge at the side of the harvester if considered more desirable. The conveyer is operated by a chain 31 extended from a sprocket 32 on the shaft 25 to a similar sprocket 33 on an intermediate shaft 33' of the conveyer. This conveyer is of usual construction for such work and is supported by the superstructure 15 at 34.

The topping mechanism in the present embodiment of the invention comprises two vertical standards 35 disposed in the space between the yokes of each pair, and supported by a suitable framing 36 extended from the superstructure 15 through the racks 22, and carrying at their upper ends overlapped cutting knives 39 disposed close to the jaws 23 passing thereover, the intersection of the edges of the knives being intermediate of the jaws 23. The superstructure 15 is raised and lowered at its rear end by means of a lever 40, pivoted on the frame 10, and moving adjacent a fixed apertured segment 41, so that a pin 42 may be coengaged through registered openings of the segment and lever. The lever forwardly of its pivot is bifurcated and each forward end portion is formed with a curved slot 43 in which is received a shaft 44 fixed in the rear part of the superstructure 15. A seat 45 is provided for the operator, conveniently to the hand wheel 46 controlling the steering mechanism, and the levers 40.

The draft connections with the wagon are preferably of such a nature that the harvester may be steered independently thereof to a certain extent to maintain it in such approximate registry with the lines of beets to be harvested that the tops will be properly gripped.

In the present case there is a transverse bar 47 secured beneath the wagon body to which the yoke 48 is slidably connected. It will be understood however that if desired steering wheels may be provided at the rear instead.

In operation, the harvester being connected to the wagon to be loaded, is drawn along the rows of beets to be gathered, as nearly as possible with the two rows equally spaced between the wheels, and the levers 40 operated to allow the yokes to rest upon the ground on each side of each row. In this way the jaws are brought into proper position to engage the beet tops, and the outer arms of the yokes engage the earth with sufficient traction to rotate the sets of yokes in their orbits around the plates 16. The coöperation of all the sets of yokes through the meshing of the gears 26 on the shaft 25 with the several racks, makes the operation of all continuous, regardless of slight inequalities in the surface of the earth. The weight of the complete sets of gathering devices being supported mainly upon the ground direct, a large amount of friction is eliminated and the strength required in the supporting frame work largely diminished. The strain on operative connections which would be required to operate the gathering mechanism from a separate traction wheel would be so great that very heavy construction would have to be employed therefor, and a corresponding increase in the strength of the frame work made, largely increasing the weight and the tractive force required to move the harvester.

In the rotation of the yokes, it will be observed that by the location of the enlargements of the plates 16 the opposed jaws reach a level while separated approximately corresponding to that of the head of the beet, by which is meant the large upper part, and immediately afterward, and before rising the yokes are moved to the wide portions of the plates 16, whereby their opposed jaws are forced inwardly and against the beets, being held in that position while the jaws continue in their orbits, resulting in the lifting of the beets from the ground whence they are carried to the topping device and a short distance beyond this the narrow portions of the plates are encountered, whereby the yokes are allowed to contract, separating the jaws and releasing the beets which then fall into the conveyer, the jaws passing downwardly on either side thereof.

A trough 49$^a$ leads from beneath the topping mechanism, outwardly through the racks to one side of the machine, being inclined downwardly, so that the tops are left in a row, conveniently for removal.

In order to adapt the length and form of the outer arms of the yokes to the differences in soil conditions, there is shown in Fig. 5 an extensible outer arm on the yoke. The yoke arm proper 50 is provided with an outwardly pressed integral loop 51 having a set screw 52 engaged therein. Set slidably and removably in this loop is the shank 53 of a traction head 54 broadened so that in case the ground is muddy the tractive efficiency of the device can be largely increased by lengthening the arms so that the head 54 will be projected deeply into the ground. It is an important advantage of the invention that considerable clearance is provided between the adjacent arms of the spring yoke, whereby the mounting of the cutting mechanism is permitted, enabling the removal of the tops of the beets, while the beets are themselves firmly gripped in the jaws of the yoke, allowing plenty of room for the removal of the tops and the beets separately.

What is claimed is:

1. A device of the class described comprising a wheeled frame, alined annular plates carried thereby in parallel relation, a multiplicity of spring yokes each having arms engaged on each side of respective plates and projecting outwardly thereof, adjacent arms of the yokes on the two plates having coöperating gripping jaws each of the plates having cam portions thereon adapted to spread the spring yokes for coöperative gripping engagement with yokes on the other plate for engagement with a beet interposed, through a portion of their movement, the yokes being connected in annular series, and adapted to travel orbitally on the plates, one arm of each yoke being extended outwardly for tractive engagement with the earth when at the lower part of its orbit, for operating of the device, under forward movement of the frame, a topping and a conveyer device each operatively connected with the yokes, and means to move the yokes to inoperative position.

2. A device of the class described comprising a wheeled frame, a superstructure mounted thereon for vertical movement, means to adjust it vertically, stationary annular plates carried by the superstructure in parallel coaxial relation, beet gripping devices connected in annular series and orbitally movable on the plates, said gripping devices having extensions adapted for tractive engagement with the earth at the lower part of their orbit for movement of the gripping devices under forward movement of the frame, an annular internal rack being connected to each series of gripping devices concentric therewith, separate devices for acting upon the beets gripped by the gripping devices, and operative connections between the rack and the said separate devices.

3. A device of the class described comprising a wheeled frame, a vertically movable superstructure, means to adjust the superstructure vertically, stationary annular plates carried by the superstructure, in parallel coaxial relation, a series of U-shaped spring yokes on each plate, the yokes having rollers on each arm receiving the edges of the plates thereagainst, the yokes tending to spring with their arms inwardly, the plates being widened at certain parts of their length to bear opposed arms of the yokes on each plate into coengagement, gripping jaws formed on the coengaging arms, extensions formed on the yokes to engage the earth for orbital movement of the yokes around the plates, when the superstructure is in lowered position, under forward movement of the frame, and for opening and closing operation of the yokes as described.

4. In a vegetable pulling machine of the class described, a wheeled support, parallel series of vegetable engaging devices mounted thereon for orbital movement and adapted to coengage upon the body of a beet, parallel guide plates spaced from each other and adapted to engage outwardly of the respective series of engaging devices, said engaging devices being constructed arranged and adapted to give a clearance inwardly thereof, and a topping mechanism mounted within the orbits of the engaging devices.

In testimony whereof I have hereunto set my hand in presence of two subscribing witnesses.

JOHN STONE.

Witnesses:
  DEPUE VUOIS,
  B. E. FINLEY.

---

Copies of this patent may be obtained for five cents each, by addressing the "Commissioner of Patents, Washington, D. C."